Figure 1:
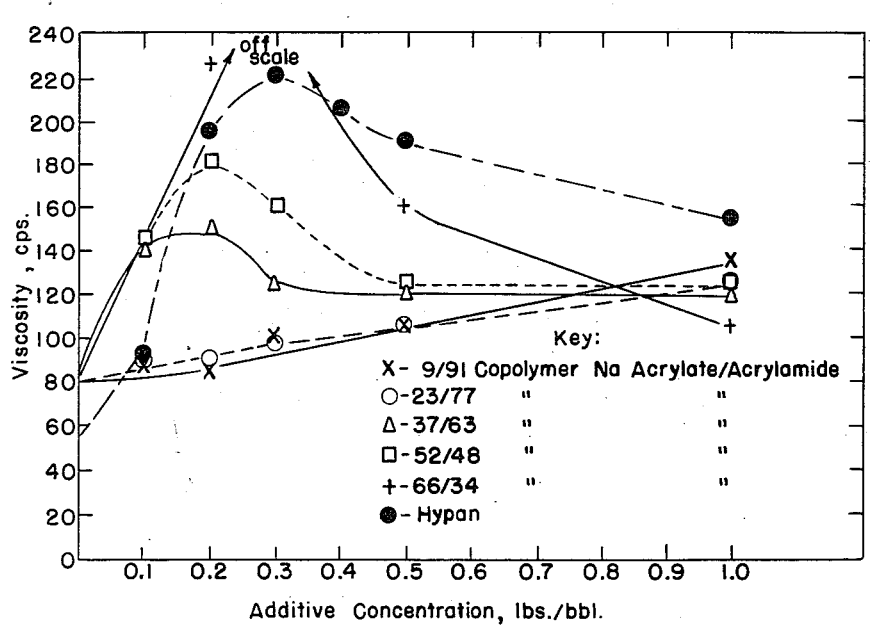

United States Patent Office 2,775,557
Patented Dec. 25, 1956

2,775,557

DRILLING MUDS CONTAINING ACRYLIC ACID-ACRYLAMIDE COPOLYMER SALTS

Russell L. Morgan, Riverside, Conn., assignor to American Cyanamid Company, New York, N. Y., a corporation of Maine Application December 8, 1954, Serial No. 473,820

3 Claims. (Cl. 252—8.5)

This invention relates to a method of conditioning aqueous mud or clay dispersions of the type used in drilling oil wells, gas wells and other deep wells and in particular to the addition to such dispersions of a class of conditioning agents which will improve the water loss characteristics of the mud but will not cause an objectionable increase in the viscosity and gel strength thereof. The invention includes methods of improving the characteristics of aqueous drilling muds by adding these conditioning agents thereto and also includes the muds so obtained.

In drilling deep wells by the rotary drilling process an aqueous clay suspension known as a drilling mud is pumped down through the hollow drill pipe, across the face of the drill bit and upwardly through the drill hole. The mud serves to raise the drill cuttings to the surface of the ground and also to seal the sides of the well to prevent loss of water and drilling fluids into the formation through which the drill hole is being bored. After each passage through the well the mud is passed through a settling tank or trough wherein the sand and drill cuttings are separated.

In such drilling muds a relatively low viscosity is desirable to facilitate the recirculation of the fluid through the well. The gel strength of the mud must also be controlled, as too strong a gel will interfere with settling of the sand and cuttings from the mud and will also make it difficult to pump the mud if the drilling operation is stopped for a time. A low water loss is very important, as the mud will thicken or solidify and cause the drilling tools to stick in the well if too much water is lost by seepage into the surrounding formation.

It is a primary object of the present invention to provide a class of reagents for use in making up drilling muds, or for addition to previously prepared muds during the use thereof, which will combine a high degree of water loss control with relatively low viscosity and gel strength in the mud. It is a further object to provide, as a preferred class of reagents for use in practicing the invention, a class of conditioning agents which will function with a high degree of efficiency in contaminated muds and lime-base muds, including particularly muds containing water-soluble inorganic alkali metal salts such as sodium chloride and sodium sulfate and muds containing calcium compounds such as gypsum or calcium sulfate, lime and the like.

The above and other objects are accomplished, in accordance with the invention, by incorporating into aqueous clay dispersions a class of water-soluble salts of acrylic acid-acrylamide polymers of substantial molecular weight characterized by a minor content of acrylic acid groups in comparison with their acrylamide groups. I have found that such polymers or copolymers will function as highly effective water loss-controlling agents without producing undesirable viscosity or gel strength maxima in aqueous clay drilling muds.

Figure 2:
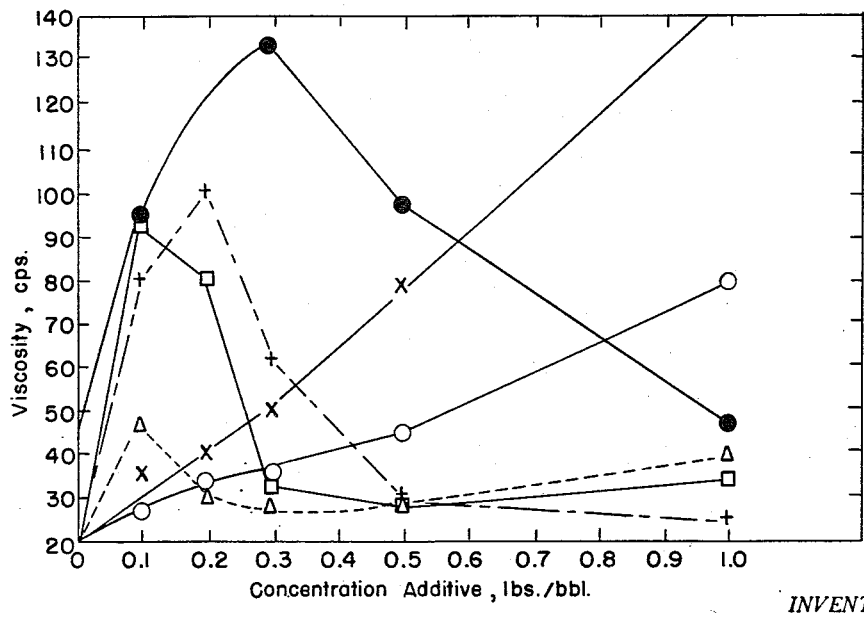

Some of the most important advantages of the invention are illustrated graphically by the attached drawings, wherein:

Fig. 1 is a graph showing the viscosities of an uncontaminated aqueous drilling mud after treatment with a number of acrylic acid-acrylamide polymers having varying ratios of acrylate to acrylamide groups, and Fig. 2 is a similar graph showing the viscosities of a contaminated aqueous drilling mud when treated with the same agents.

Referring to Fig. 1, it will first be noted that the ratios of acrylate to acrylamide groups in the polymers range from about 10:90 to about 65:35, and that a material designated as "Hypan" is also included. Hypan is a hydrolyzed polyacrylonitrile wherein the ratio of acrylate groups to acrylamide and nitrile groups is about 75:25; this material is at present in wide commercial use as a water loss-controlling agent for drilling muds. The graph shows that all of the polymers containing more acrylate groups than acrylamide groups cause very high viscosities in the mud when small quantities are added thereto, whereas the polymers containing a lower proportion of acrylate to acrylamide groups do not cause this undesirable viscosity increase to any substantial extent. Fig. 2 shows that these differences are even more pronounced in high solids muds contaminated with inorganic salts. In its broadest aspects, therefore, the invention is based on the discovery that objectionable viscosity maxima in drilling muds can be avoided by incorporating therein, as water loss-controlling agents, acrylate-acrylamide polymers wherein the ratio of acrylate to acrylamide groups is controlled and maintained substantially less than 1:1. As will subsequently be explained, the ratios included within the broad scope of the invention are between about 10:90 and 45:55, and the preferred ranges are from 25:75 to 40:60.

The acrylate-acrylamide polymers used in practicing the invention may be prepared by any suitable method. The two methods of greatest commercial utility are, first, the copolymerization of acrylic acid and acrylamide in the desired ratios in the presence of oxidizing catalysts such as ammonium or potassium persulfate and, secondly the hydrolysis of a previously prepared polyacrylamide to the desired extent. Both methods are illustrated in the attached examples. The copolymerization procedure is probably preferred when an exact control of the ratio of acrylate to acrylamide groups is desired, as in obtaining copolymers wherein the ratio of acrylate to acrylamide groups is maintained between 25:75 and 40:60 whereas the hydrolysis method is probably somewhat cheaper. No substantial differences have been noted between the behaviour of the two types of polymers in drilling muds, good results being obtained with both.

The polymers used should have a substantial molecular weight, at least 10,000 being probably the minimum, in order to obtain good water loss-controlling properties in the reagent. For most purposes a polymer having a molecular weight of at least 50,000 is greatly preferred, and still more efficient reagents are obtained when the molecular weight is in the range of 75,000 to 150,000. It is a particular advantage of the invention, however, that acrylate-acrylamide polymers in the medium and high molecular weight range may be used without producing excessively high viscosities and gel strengths in the mud if the ratio of acrylate to acrylamide groups is maintained below about 40:60; this is in marked contrast to the linear chain polymers of comparable molecular weights containing more than 50% of carboxylic acid groups, which produce extremely high viscosities and gel strengths in drilling muds. It will be seen, therefore, that there is no theoretical upper limit on the molecular weights of the polymers of the invention insofar as their viscosity-producing properties are concerned, although for greater cheapness and ease of preparation the polymers of medium molecular weight in the range of about 100,000 to 350,000 are preferred.

Any of the drilling muds now in use may be treated to advantage with the copolymers of the invention. The muds may be made up with highly bentonitic clays such as the well-known Rogers Lake mud from California, with "P-95" clay which is a high-yield, high density clay used in deep-hole drilling, or with low-yield clays such as are obtained from the drilling formation itself and are typified by those obtained from the Ventura field in California. Muds containing Attapulgus clay are frequently used in drilling through salt-containing formations, and may be treated to advantage with the polymers of the invention. The acrylate-acrylamide copolymers containing minor proportions of acrylate groups may also be used in emulsion-type muds wherein a hydrocarbon such as crude oil is emulsified in an aqueous clay suspension, usually in quantities on the order of 10% to 40% on the weight of the mud.

The quantities of the acrylate-acrylamide polymers of the invention that are incorporated into the above and other drilling fluids are usually within the range of about 0.1 to about 4–5 pounds per barrel of drilling mud, although in exceptional cases quantities as high as 8 pounds per barrel may be added. For most purposes quantities on the order of about 0.2–2 pounds per barrel are used. These reagents may be used alone, but other known mud-conditioning materials such as quebracho and sodium hydroxide are also usually incorporated into the mud. Other known conditioning agents which may be employed in conjunction with the copolymers of the invention are alkali metal polyphosphates such as tetrasodium pyrophosphate sodium tetraphosphate, sodium hexametaphosphate and the like, nigrosine, pectate pulp and other wall-building reagents, and other supplemental water loss-controlling reagents if desired.

Many drilling muds contain substantial quantities of water-soluble inorganic salts which have an undesirable action on the properties of the mud. These salts may be contaminants that are dissolved into the mud from the formation being drilled, as in the case of sodium chloride, sodium sulfate and gypsum and limestone or they may be added to the mud for special purposes, as in the case of lime-base muds used in drilling through gypsum formations. My tests have shown that in such contaminated muds the acrylate-acrylamide polymers containing from 25 to 40 mol percent of acrylate groups and 75 to 60 percent of acrylamide groups are particularly useful, as they reduce the water loss from such muds to a substantially lower extent than the polymers of lower carboxylic acid content. It will be understood, therefore, that the acrylic acid-acrylamide polymers wherein the ratio of carboxylic acid salt groups to amide groups is between about 25:75 and 40:60 constitute a preferred class of reagents within the broad scope of my invention, particularly for the treatment of contaminated muds.

During drilling operations it is common practice to add a water loss-control reagent to the mud stream while the drilling is in progress. Under these conditions a high viscosity and gel strength in the mud is particularly objectionable, as it increases the power requirements for mud circulation and interferes with the settling out of cuttings from the mud. The low viscosity-producing polymers of the present invention are particularly well suited for addition to previously-prepared mud systems during the course of a drilling operation and their efficiency in this respect is particularly good in high-solids muds and in contaminated muds including those containing alkali metal salts, gypsum and lime.

The invention will be further illustrated by the following specific examples which describe the preparation of representative acrylate-acrylamide polymers and the results of tests of these polymers in representative drilling muds. It should be understood, however, that while these examples may describe certain preferred embodiments of the invention they are given primarily for purposes of illustration, and that variations and substitutions of equivalents may be resorted to within the scope of the appended claims.

EXAMPLE 1

*Preparation of acrylate-acrylamide polymers*

A reagent solution is prepared by dissolving acrylic acid and acrylamide in the molar ratios desired in the polymer in water containing sufficient ethanol, isopropanol or other water-soluble monohydric alcohol to regulate the desired degree of polymerization. The molecular weight of the copolymer is increased by reducing the alcohol concentration; thus, for example, with 17–20% of isopropanol in 83–80% of water a copolymer having a molecular weight in the range of about 140,000 to 160,000 is formed whereas products in the molecular weight range of 200,000 to 300,000 are obtainable with 5–10% isopropanol solutions. Sufficient 50% aqueous sodium hydroxide solution is added to neutralize all of the acrylic acid and bring the pH to 7.0.

A catalyst solution is prepared by dissolving a water-soluble oxidizing agent such as ammonium or potassium persulfate in a large quantity of water, the amount of oxidizing agent being about 0.2% to 0.5% of the weight of the monomers to be copolymerized.

A jacketed reaction vessel equipped with an agitator is charged with water which is heated to a desired reaction temperature such as 80° C. The agitator is started and the two solutions are pumped into the vessel at relative rates such as to maintain the ratio of catalyst to monomers within the range indicated. The discharge of polymer solution from the autoclave is so regulated as to obtain a residence time of about one hour; any additional reaction that may be necessary will take place as the polymer solution is cooling.

The preparation of a copolymer containing 35 mol percent of acrylate and 65 mol percent of acrylamide groups is representative. A reagent solution was prepared by dissolving 3507 grams of acrylamide in 9160 grams of 21% aqueous acrylic acid, adding 1740 cc. of isopropanol and then adding 2128 grams of 50% aqueous sodium hydroxide solution. The catalyst solution contained 18 grams of potassium persulfate in 10 liters of water. The internal temperature of the reaction vessel was maintained at 80° C. and each of the two solutions was pumped in at proportionate rates of about 25 cc. per minute. The capacity of the reaction vessel was about 3 liters and its rate of discharge was 50 cc. per minute; the average residence time of the reaction mixture was therefore one hour. Samples of the reaction product when tested by the bromate-bromide method were found to have an iodine number of 6.6 which was reduced to 1.4 after an additional 30 minutes at 80° C. The molecular weight of the copolymer was approximately 150,000.

Samples of this polymer were tested in a wide variety of drilling muds which were prepared by the procedure described in Example 2. The muds indicated in the first column of the following table were as follows.

The bentonitic clay mud contained 40 lbs. per barrel of X-act clay (a calcium bentonite-containing clay) and 5 lb. per barrel of Magcogel clay (a sodium bentonite clay) together with 2 lbs. per barrel of quebracho and 0.5 lbs. per barrel of NaOH. The Attapulgus clay mud contained 20 lbs. per barrel of this clay and 0.5 lbs. per barrel of NaOH. The sea water mud was prepared by suspending 80 lbs. per barrel of High-Yield clay in sea water along with 1 lb. per barrel of quebracho and 0.5 lb. per barrel of sodium hydroxide. The low-solids lime-base mud contained 15 lbs. per barrel of Magcogel clay, 3 lbs. per barrel of quebracho, 3.5 lbs. per barrel of NaOH, 2 lbs. per barrel of calcium lignin sulfonate and 10 lbs. per barrel of calcium hydroxide.

The test results were as follows:

| Mud Used | Quantity, Lbs./Bbl. | Viscosity, Cps. | Gel Strength 0 Min. | Gel Strength 10 Min. | Water Loss, 30 Min. |
|---|---|---|---|---|---|
| Bentonitic clay mud | None | 20 | 5 | 30 | 9.0 |
|  | 0.2 | 26 | 1 | 60 | 7.8 |
|  | 0.3 | 30 | 1 | 40 | 7.4 |
|  | 0.5 | 35 | 1 | 45 | 7.0 |
|  | 1.0 | 48 | 2 | 35 | 6.8 |
| Same, containing 17.5 lbs./bbl. of NaCl. | None | 12.5 | 5 | 10 | 55.5 |
|  | 1.0 | 15 | 1 | 14 | 27.0 |
| Salt-saturated Attapulgus clay mud (105 lbs./bbl. of NaCl. | None | 20 | 12 | 10 | 18.2 |
|  | 2.0 | 11 | 1 | 2 | 35.5 |
| High Solids Sea water mud. | None | 7.5 | 2 | 5 | 47.5 |
|  | 2.0 | 15 | 1 | 4 | 20.5 |
| Low - solids Lime - Base mud. | None | 11 | 0 | 1 | 22.5 |
|  | 1.0 | 15 | 0 | 1 | 15.5 |
| Bentonitic mud plus: 3 lbs./bbl. CaSO₄ | None | 11.0 | 2 | 8 | 45.0 |
|  | 1.0 | 35.0 | 2 | 10 | 14.0 |
| 20 lbs./bbl. CaSO₄ | None | 8.5 | 2 | 7 | 42.0 |
|  | 1.0 | 11 | 0 | 3 | 15.0 |

These results show that the acrylate-acrylamide copolymers of the present invention combine a high degree of water loss-controlling efficiency with low viscosities and gel strengths in fresh muds and are also efficient in contaminated muds.

EXAMPLE 2

*Partial hydrolysis of polyacrylamide*

Polyacrylamide having a molecular weight of approximately 250,000 was partially hydrolyzed by heating it with aqueous sodium hydroxide solutions. A solution of 2500 grams of the polyacrylamide in four times its weight of water was heated to 85°–90° C. and agitated at these temperatures while the following procedure was carried out.

*Product No 1.*—A solution of 70 grams of NaOH in 200 cc. of water was added. After 30 minutes heating a 2500 cc. sample was removed. The molar ratio of sodium acrylate to acrylamide in this product was 9:91.

*Product No. 2.*—A solution of 110 grams of NaOH in 250 cc. of water was added to the remainder and heating was continued for one hour, when a second 2500 cc. sample was taken. The sodium acrylate: acrylamide ratio was 23:77.

*Product No. 3.*—An additional 125 grams of NaOH in 300 cc. of water was added and a third 2500 cc. sample removed after 3 hours. Its sodium acrylate:acrylamide ratio was 37:63.

*Product No. 4.*—A further 85 grams of NaOH in 200 cc. of water was added and heating was continued for 4 hours, after which a 2500 cc. portion having a 52:48 ratio of sodium acrylate to acrylamide was removed.

*Product No. 5.*—To the residue there was added 55 grams of NaOH in 100 cc. of water and heating was continued for an additional 8 hours. The sodium acrylate:acrylamide ratio in this final product was 66:34.

Increasing quantities of these products were added to samples of aqueous clay drilling muds and the viscosities of the resulting muds were determined. The muds were prepared by hydrating the clays for 24 hours, adding NaOH, quebracho and other thinning agents and diluting with water to the desired consistency. Where contaminants were used, they were added at this point; in all cases the muds were conditioned by stirring for an additional 24 hours. The additives under test were then incorporated into 350 cc. samples of the mud in quantities from 0.1 gram to 1.0 gram (equivalent to 0.1–1 lb. per barrel) and the mud was agitated at 150° F. for 16 hours. After cooling to room temperature the viscosity and zero and 10-minute gel strengths were measured with a Fann V-G meter and the 30-minute water loss was determined on a 4-unit filter press, following A. P. I Code 29.

The viscosity data obtained with a high solids, low pH red mud is shown in Fig. 1 of the drawings. This mud contained 60 lbs. per barrel of x-act clay and 15 lbs. per barrel of Magcogel clay, 3 lbs. per barrel of quebracho, 0.4 lbs. per barrel of sodium tetraphosphate and 1 lb. per barrel of NaOH and had a pH of 9.0.

Fig. 2 of the drawing shows the viscosities of a mud of the type used in California containing 158 lbs. per barrel of Ventura Dent clay, 135 lbs. per barrel of Macco P-95 clay, 2 lbs. per barrel of quebracho and 1 lb. per barrel of NaOH. This mud contained 135 parts per million of $Ca^{++}$ ions, 85 p. p. m. of $=SO_4$, 43 p. p. m. of $Mg^{++}$, 125 p. p. m. of NaCl and 550 p. p. m. of $CaCO_3$ and had a pH of 8.4.

In both types of a mud a 75% hydrolyzed polyacrylonitrile of approximately 190,000 molecular weight, representative of a product in wide commercial use for water loss control, was tested for purposes of comparison.

Fig. 1 shows clearly the beneficial results obtained by decreasing the percentage of carboxylic acid salt groups in the sodium acrylate-acrylamide copolymers. In the muds containing Product No. 5, the 66:34 copolymer, the initial viscosity increase was so high that the reading was off the scale of the instrument used; with Product No. 4 the initial viscosity was better than the commercial product but still objectionably high. Only a slight increase was noted in the muds containing Product No. 3 and this increase disappeared promptly at a concentration of 0.3 lbs. per barrel of the additive; a material of this type having a sodium acrylate to acrylamide ratio in the range of about 30:70 to about 40:60 is best for most practical purposes. There was no initial viscosity increase with Products Nos. 1 and 2 and therefore the 10:90 to 25:75 sodium acrylate to acrylamide copolymers typified by these materials are well suited for use in uncontaminated muds.

Fig. 2 of the drawings shows that comparable results are obtained in contaminated muds insofar as viscosity increase at low additive concentrations is concerned. Products Nos. 1 and 2 appear to cause a gradual rise in the mud viscosity as larger amounts are added but this is not objectionable in the case of Product No. 2.

The water loss and gel strength measurements are shown in the following table.

| Additive | Uncontaminated Mud | | | Contaminated Mud | |
|---|---|---|---|---|---|
|  | Concentration, Lbs./Bbl. | 10 Min. Gel | Water Loss, 30 Min. | 10 Min. Gel | Water Loss, 30 Min. |
| Control | | 100 | 6.8 | 50 | 16.5 |
| Prod. No. 1 | 0.1 | 185 | 5.7 | 75 | 13.5 |
|  | 0.2 | 175 | 5.2 | 80 | 11.0 |
|  | 0.3 | 160 | 4.9 | 90 | 9.9 |
|  | 0.5 | 160 | 4.6 | 110 | 8.3 |
|  | 1.0 | 160 | 4.0 | 180 | 5.8 |
| Prod. No. 2 | 0.1 | 100 | 5.6 | 40 | 12.0 |
|  | 0.2 | 100 | 5.0 | 45 | 9.8 |
|  | 0.3 | 100 | 5.0 | 50 | 9.0 |
|  | 0.5 | 100 | 4.6 | 55 | 8.0 |
|  | 1.0 | 100 | 4.4 | 65 | 5.2 |
| Prod. No. 3 | 0.1 | 100 | 5.6 | 75 | 12.0 |
|  | 0.2 | 105 | 5.4 | 75 | 9.0 |
|  | 0.3 | 190 | 4.6 | 80 | 8.4 |
|  | 0.5 | 240 | 4.1 | 70 | 7.2 |
|  | 1.0 | 180 | 4.0 | 80 | 6.5 |
| Prod. No. 4 | 0.1 | 220 | 5.8 | 125 | 14.0 |
|  | 0.2 | 290 | 5.8 | 240 | 11.5 |
|  | 0.3 | 500 | 5.6 | 150 | 8.4 |
|  | 0.5 | 400 | 4.4 | 75 | 6.8 |
|  | 1.0 | 250 | 4.0 | 70 | 5.0 |
| Prod. No. 5 | 0.1 | 265 | 6.0 | 140 | 16.8 |
|  | 0.2 | 400 | 6.1 | 250 | 16.4 |
|  | 0.3 | Off Scale | 6.3 | 300 | 11.5 |
|  | 0.5 | 500 | 5.2 | 75 | 7.3 |
|  | 1.0 | 260 | 4.8 | 20 | 6.5 |
| Hypan | 0.1 | 170 | 7.0 | 125 | --- |
|  | 0.2 | 225 | 7.0 | 200 | 16.0 |
|  | 0.3 | 275 | 6.4 | 280 | 15.2 |
|  | 0.5 | 560 | 5.7 | >600 | 13.0 |
|  | 1.0 | Off Scale | 4.3 | 250 | 5.8 |

These results show that the undesirably high viscosities and gel strengths encountered upon adding small quantities of hydrolyzed polyacrylonitrile to aqueous drilling muds are caused by the large proportion of carboxylic acid salt groups in these additives and can be avoided by substituting acrylate-acrylamide copolymers wherein the acrylate component is about 40 to 45 percent or less. Products Nos. 4 and 5, which contain more than 50 mol percent of sodium acrylate, produce high viscosities and gel strengths in uncontaminated muds similar to those caused by hydrolyzed polyacrylonitrile, whereas little or no increases were noted with Products Nos. 1, 2 and 3.

EXAMPLE 3

Three sodium acrylate-acrylamide copolymers containing 37 mol percent of acrylate and 63 mol percent of acrylamide groups were made by the process of Example 1. Polymer No. 1 was a material prepared by suspending the monomers in water containing isopropanol at 70° C. and adding 0.5% of ammonium persulfate catalyst on the weight of the monomers in several portions; its molecular weight was 244,000. Polymer No. 2, prepared with the same quantity of catalyst but less isopropanol, had a molecular weight of 289,000. Polymer No. 3, having a molecular weight of 611,000, was prepared with no isopropanol and a smaller amount of catalyst. All the polymere were post-neutralized with sodium hydroxide to pH 7 to convert the acrylic acid groups into sodium acrylate groups.

Mud formulations were made up by the procedure described in Example 2 as follows:

Mud A contained 40 lbs. per barrel of x-act clay, 5 lbs. per barrel of Magcogel clay, 2 lbs. per barrel of quebracho, 0.5 lbs. per barrel of NaOH, 17.5 lbs. per barrel of NaCl and 1 lb. per barrel of the polymer under test.

Mud B contained 20 lbs. per barrel of $CaSO_4 \cdot 2H_2O$ instead of salt, and was otherwise the same as Mud A.

Mud C contained 15 lbs. per barrel of Magcogel clay, 3 lbs. per barrel of quebracho, 3.5 lbs. per barrel of NaOH, 2 lbs. per barrel of causticized lignite, 10 lbs. per barrel of $Ca(OH)_2$ and 1 lb. per barrel of the additive under test.

These muds were tested for viscosity, gel strength and 30 minute water loss with the following results.

|  | 1.0 Lb./Bbl. of Polymer No. | Viscosity, Cps. | Gel Strength | | Water Loss, cc./30 Min. |
|---|---|---|---|---|---|
|  |  |  | 0 Min. | 10 Min. |  |
| Mud A | None | 11 | 12 | 16 | 48 |
|  | 1 | 16 | 7 | 26 | 19.5 |
|  | 2 | 16 | 4 | 30 | 16 |
|  | 3 | 18 | 6 | 40 | 13.5 |
| Mud B | None | 10 | 8 | 16 | 36 |
|  | 1 | 11 | 1 | 8 | 12.5 |
|  | 2 | 13 | 1 | 16 | 10 |
|  | 3 | 15 | 2 | 17 | 8.5 |
| Mud C | None | 8 | 3 | 3 | 21 |
|  | 1 | 16 | 1 | 5 | 6.5 |
|  | 2 | 18 | 2 | 7 | 10 |
|  | 3 | 22 | 3 | 8 | 9.5 |

What I claim is:

1. In a process for drilling a well wherein a mud seal of improved water-retaining properties is formed on the wall of said well by circulating therein an aqueous clay base drilling mud containing, as a wall-sealing agent, about 0.1 to 5 lbs. per barrel of a water-soluble salt of an acrylic acid-acrylamide polymer having a molecular weight of at least 10,000, the method of avoiding the formation of high viscosity in said mud which comprises adding said wall-sealing agent thereto as a polymer wherein the ratio of carboxylic acid salt groups to amide groups is between about 10:90 and 45:55.

2. A method according to claim 1 wherein the ratio of carboxylic acid salt groups to amide groups in the polymer is between 25:75 and 40:60.

3. In a process for drilling a well wherein a mud seal of improved water-retaining properties is formed on the wall of said well by circulating therein an aqueous clay base drilling mud containing a member of the group consisting of inorganic alkali metal salts, lime and gypsum and, as a wall-sealing agent, about 0.1 to 5 lbs. per barrel of a water-soluble salt of an acrylic acid-acrylamide polymer having a molecular weight of at least 10,000, the method of avoiding the formation of high viscosity in said mud which comprises adding said wall-sealing agent thereto as a polymer wherein the ratio of carboxylic acid salt groups to amide groups is between about 25:75 and 40:60.

References Cited in the file of this patent
UNITED STATES PATENTS 2,552,775    Fischer et al.    May 15, 1951
2,718,497    Oldham et al.    Sept. 20, 1955